US012115469B2

(12) United States Patent
Enomura

(10) Patent No.: US 12,115,469 B2
(45) Date of Patent: Oct. 15, 2024

(54) VACUUM DEAERATOR EQUIPPED WITH REFINING DEVICE

(71) Applicant: M. TECHNIQUE CO., LTD., Izumi (JP)

(72) Inventor: Masakazu Enomura, Izumi (JP)

(73) Assignee: M. TECHNIQUE CO., LTD., Izumi (JP)

( * ) Notice: Subject to any disclaimer, the term of this patent is extended or adjusted under 35 U.S.C. 154(b) by 326 days.

(21) Appl. No.: 17/602,607

(22) PCT Filed: Apr. 9, 2019

(86) PCT No.: PCT/JP2019/015523
§ 371 (c)(1),
(2) Date: Oct. 8, 2021

(87) PCT Pub. No.: WO2020/208724
PCT Pub. Date: Oct. 15, 2020

(65) Prior Publication Data
US 2022/0203267 A1   Jun. 30, 2022

(51) Int. Cl.
*B01D 19/00*   (2006.01)

(52) U.S. Cl.
CPC ..... *B01D 19/0052* (2013.01); *B01D 19/0031* (2013.01); *B01D 19/0036* (2013.01)

(58) Field of Classification Search
None
See application file for complete search history.

(56) References Cited

U.S. PATENT DOCUMENTS

| | | | |
|---|---|---|---|
| 3,442,317 A | 5/1969 | Wieland | |
| 2007/0186772 A1* | 8/2007 | Hoffmann | B01D 19/0036 95/266 |

FOREIGN PATENT DOCUMENTS

| | | | |
|---|---|---|---|
| CN | 201445833 U | * | 5/2010 |
| CN | 103465387 A | | 12/2013 |
| CN | 104222186 A | | 12/2014 |
| CN | 104888642 A | | 9/2015 |
| CN | 204847394 U | | 12/2015 |
| CN | 105672098 A | | 6/2016 |
| CN | 206355904 U | | 7/2017 |
| CN | 206748827 U | | 12/2017 |

(Continued)

OTHER PUBLICATIONS

JP2003302163A_ENG (Espacenet machine translation of Yamamoto) (Year: 2003).*

(Continued)

*Primary Examiner* — Gabriel E Gitman
(74) *Attorney, Agent, or Firm* — Birch, Stewart, Kolasch & Birch, LLP

(57) ABSTRACT

A vacuum deaerator is provided with a refining device with which it is possible to suppress the occurrence of situations involving interrupted discharging and continuously discharge a material being treated that is highly viscous, etc. The vacuum deaerator introduces a liquid material being treated into a vessel having a vacuum therein to perform deaeration and then discharged the material being treated out of the vessel. A rotating rotor with refining device arranged in the vessel and a rotating discharge vane provided separately from the rotating rotor for the purpose of discharging the material being treated in the vessel out of the vessel are installed.

11 Claims, 1 Drawing Sheet

(56) References Cited

FOREIGN PATENT DOCUMENTS

| | | | | |
|---|---|---|---|---|
| CN | 107875680 A | * | 4/2018 | ......... B01D 19/0052 |
| JP | 47-6038 U | | 9/1972 | |
| JP | 63-162005 A | | 7/1988 | |
| JP | 2-4602 U | | 1/1990 | |
| JP | 4-134404 U | | 12/1992 | |
| JP | 7-136406 A | | 5/1995 | |
| JP | H07136406 A | * | 5/1995 | |
| JP | 7-208375 A | | 8/1995 | |
| JP | 2000-281786 A | | 10/2000 | |
| JP | 2001-9206 A | | 1/2001 | |
| JP | 2003302163 A | * | 10/2003 | |
| JP | 2005-205322 A | | 8/2005 | |
| SU | 822792 A1 | * | 4/1981 | |

OTHER PUBLICATIONS

CN107875680A_ENG (Espacenet machine translation of Lei) (Year: 2018).*
CN201445833U_ENG (Espacenet machine translation of Lu) (Year: 2010).*
SU822792_ENG (Google Translate manual translation of Gonotskij) (Year: 1981).*
JPH07136406A_ENG (Espacenet machine translation of Iriuchijima) (Year: 1995).*
International Search Report for PCT/JP2019/015523 mailed on Jul. 9, 2019.
Extended European Search Report for European Application No. 19923881.7, dated Sep. 20, 2022.

* cited by examiner

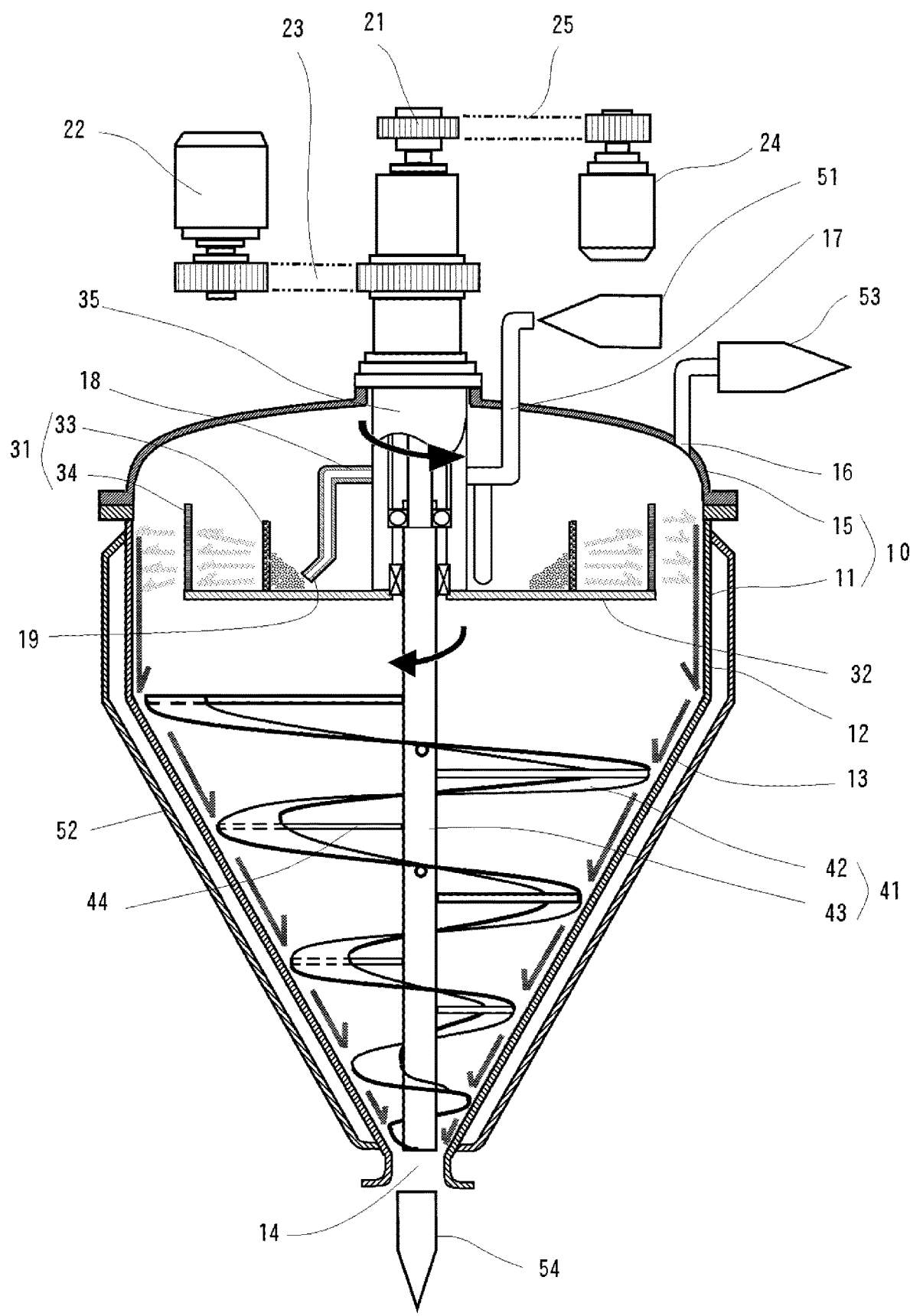

VACUUM DEAERATOR EQUIPPED WITH REFINING DEVICE

TECHNICAL FIELD

The present invention relates to a vacuum deaerator equipped with a refining device.

BACKGROUND ART

In the course of producing various products such as pharmaceutical medicines, cosmetics, foods, and fine chemicals, air bubbles are formed in a liquid form of processing substance, and these air bubbles cause various troubles in production of these products. Because of this, defoaming is performed to a processing substance by using a vacuum deaerator, in this defoaming, it is required to continuously remove the air bubbles in the liquid having from a low viscosity to a high viscosity in a vacuum state. To cope with such a problem, the following prior art references are known as a vacuum deaerator equipped with a refining device. The applicant of the present invention has also brought the deaerator manufactured by M. Techniques Co., Ltd to the market.

However, while not only the apparatus can remove fine air bubbles, but also be able to connect in-line to realize the various functions such as a continuous defoaming operation under an enclosed environment, a continuous removal of a solvent or a VOC, a centrifugal separation effect, a thin film effect, a refining effect, a crushing effect, and a degassing effect in a single unit, further improvement of washability, high quality control, and high production efficiency are required, in this field of technology, there has been still a problem in smoothly discharging a processing substance in a vessel.

Especially in the case of the processing substance having a high viscosity, the degree of vacuum becomes very high in order to enhance the degassing effect. However, as the degree of vacuum increases, it becomes difficult to discharge the processing substance that has been completed the processing from under the vacuum, thus, in many cases, the substance cannot be discharged.

When such a situation that the substance cannot be discharged occurs, it has been necessary to carry out following interrupted discharge. The interrupted discharge means a discharge operation in which the continuous degassing is temporarily stopped, then, after the degree of vacuum is loosened, or the pressure therein is returned to an atmospheric pressure, the processing substance is discharged from the vessel. When the processing substance is discharged by this interrupted discharge, the inside of the vessel is again evacuated, and then, after the degree of vacuum reaches a target pressure, the processing substance is again supplied to restart the continuous operation, however, when the processing substance accumulates inside of the vessel again, it is necessary to repeatedly carry out the continuous operation and interrupted discharge so that the degree of vacuum is loosened, or the processing substance returned to an atmospheric pressure is discharged from the vessel, thus, the efficiency thereof is very poor.

In Patent Document 6, a vacuum deaerator equipped with a scraper installed inside of the vessel is disclosed; but this scraper merely scrapes off the processing substance that is adhered to an inner wall surface of the vessel. Therefore, as far as the discharge performance is concerned, this has not been to realize the discharge action to a discharge port, in other words, not to realize the push-in action to a discharge pump.

PRIOR ART DOCUMENT

Patent Document

Patent Document 1: Japanese Examined Utility Model Application Publication No. H02-004602
Patent Document 2: Japanese Patent Laid-Open Application Publication No. 2005-205322
Patent Document 3: Japanese Patent Laid-Open Application Publication No. 2001-009206
Patent Document 4: Japanese Patent Laid-Open Application Publication No. S63-162005
Patent Document 5: Japanese Patent Laid-Open Application Publication No. H07-208375
Patent Document 6: Japanese Patent Laid-Open Application Publication No. H07-136406

DISCLOSURE OF INVENTION

Problems to Be Solved by the Invention

The present invention has an object to provide a vacuum deaerator equipped with a refining device which suppresses the occurrence of a situation in which interrupted discharge is performed in performing degassing treatment on the processing substance having such as high viscosity and continuously discharges the processing substance from high vacuum condition.

In the present invention, processing substance having high viscosity means a highly viscous liquid such as a polymer solution and a paste, and in the terms of viscosity, it can be described in 5,000 mP·s or more. The highly vacuum condition means that the degree of vacuum thereof is 5 Pa or less.

Means for Solving the Problems

The present invention solves the problems by providing a vacuum deaerator equipped with a refining device in which in the vacuum deaerator which introduces a liquid form of processing substance into a vessel having a vacuum to perform deaeration and then discharges the processing substance to outside of the vessel, a rotating rotor equipped with the refining device arranged in the vessel and a rotating discharge blade for the purpose of discharging the processing substance from inside to outside of the vessel that is separately to the rotating rotor are installed.

The refining device performs the function to enhance a degassing effect by refining the processing substance. For example, a refining screen that is arranged in the rotating rotor can be shown.

The rotating discharge blade performs the function to forcibly carry the processing substance toward a discharge port of the vessel by rotating. For example, a screw type rotating discharge blade can be shown.

The present invention can be implemented by installing a temperature adjusting mechanism on the vacuum vessel.

The present invention can be implemented by installing a discharge pump such as a rotary positive displacement type uniaxial eccentric screw pump or a high vacuum pull-out type diaphragm pump on the discharge port of the vessel for the purpose of continuously pulling out the processing substance from the vessel. By this, because of the synergistic effect of both the push-in action of the processing substance into the discharge pump due to the rotating discharge blade and the suction action of the discharge pump, the continuous discharge can be realized even with a highly viscous processing substance.

Advantages

The present invention can be provided a vacuum deaerator equipped with a refining device having an enhanced function of continuously discharging a processing substance.

With this, the processing substance can be continuously discharged from inside of a vessel even in the case of degassing treatment under a high vacuum condition.

In addition, even in performing degassing treatment to a highly viscous processing substance, the occurrence of the situation in which interrupted discharge is performed can be suppressed so that the processing substance can be continuously discharged under a high vacuum condition.

BRIEF DESCRIPTION OF DRAWING

FIG. 1 This is an explanatory drawing of an inner structure of the vacuum deaerator equipped with the refining device according to the embodiment of the present invention.

BEST MODE FOR CARRYING OUT THE INVENTION

Hereinafter, the embodiment of the present invention will be explained on the basis of the drawing.

Summary

In the vacuum deaerator equipped with the refining device, a processing substance in the form of liquid is introduced into a vessel 10 having vacuum inside thereof and degassed, then, the processing substance is discharged to outside of the vessel 10.

Inside of the vessel 10, a refining device 31 provided on a rotating rotor 32 and a discharge device 41 to discharge the processing substance to outside of the vessel 10 are arranged. The processing substance is discharged to outside of the vessel through a discharge port 14 by a rotating discharge blade 42 of the discharge device 41 after being performed refining and degassing by the refining device 31.

Vessel 10

The vessel 10 is a container having hermeticity kept in a high vacuum of about 5 Pa to 0.1 Pa. In this embodiment, a container main body 11 and a cover body 15 arranged above the main body are connected so as to be openable and closable. Specifically, the container main body 11 comprises a cylindrical part 12 on the upper part of the main body and a funnel part 13 whose inner diameter is gradually reduced from the cylindrical part 12 on the lower part of the main body, and the discharge port 14 to discharge the processing substance after the degassing treatment to the outside is arranged on the lower end of the funnel part 13.

The container main body 11 is provided with a temperature adjusting mechanism 52 such as a jacket which flows a temperature adjusting fluid such as hot water or cold water along the outer wall surface of the main body. Note that the temperature adjusting mechanism 52 may also be arranged on the cover body 15. The temperature adjusting mechanism 52 may be used to keep the processing substance inside the vessel 10 in a prescribed temperature range or to heat or cool the processing substance as necessary.

The cover body 15 is provided with a vacuum port 16 to keep the inside of the vessel 10 in the vacuum state. A gas inside of the vessel 10 is discharged to outside by a vacuum pump 53 that is connected to the vacuum port 16, so that the pressure inside of the vessel 10 becomes in a vacuum state with a prescribed pressure.

Further, the cover body 15 is provided with an introduction port 17 to charge the processing substance into the vessel 10, so that the processing substance is introduced into a vessel 10 from a supply source 51 such as a tank that is connected to the introduction port.

The flanges of both the container main body 11 and the cover body 15 are disposed so as to be faced with each other and are fixed ensuring airtightness under the reduced pressure thereby being configured integral vessel 10. Here, the vessel 10 may be divided into two portions at any position, and the connecting means therebetween may be arbitrary changed.

Refining Device 31

The refining device 31 is arranged at the position corresponding to the cylindrical part 12 of the container main body 11; this includes a flat disc-shaped rotating rotor 32, a first screen 33 and a second screen 34 that are arranged at outer circumferential part of the rotating rotor. The rotating rotor 32 is rotated by a cylindrical driving axis 35. Specifically, the driving axis 35 is rotated by an electric motor 22 for the rotor arranged on the upper outside of the cover body 15 via a power transmission unit 23 for the rotor.

In an inner circumferential side of the rotating rotor 32, an annular path 18 that is connected to the introduction port 17 is arranged. The processing substance is radially introduced to the rotating rotor 32 from a charging port 19 at the front end of the annular path 18.

The upper surface of the rotating rotor 32 is made to a smooth flat surface; the charged processing substance is thin-filmed on the upper surface due to a centrifugal force of the rotation of the rotating rotor 32.

The processing substance that advances toward the outer circumferential direction of the rotating rotor 32 due to the centrifugal force passes through the first screen 33 and the second screen 34 that are annularly arranged, whereby the defoaming effect can be enhanced. The one screen may be only used; by using the first screen 33 having comparatively large mesh such as a punching plate and the second screen 34 having comparatively small mesh such as a metal mesh, the refinement can be sequentially achieved. Therefore, it is advantageous in that the smooth and appropriate refinement can be achieved. More screens such as a third screen and a fourth screen may also be used.

The processing substance having passed through the rotating rotor 32 and the second screen 34 becomes mist and collides with an inner wall surface of the cylindrical part 12. By this collision, the degassing is further promoted, and the processing substance after the collision forms thin film fluid along the inner wall surface of the cylindrical part 12, so that fine bubbles can also be defoamed.

Discharge Device 41

The discharge device 41 is provided with the rotating discharge blade 42 that is rotated by a rotary shaft 43 and is arranged on the position corresponding to a funnel part 13 in the container main body 11.

The upper end of the rotary shaft 43 penetrates through the inside of the cylindrical driving axis 35 and rotates separately from the rotating rotor 32 by an electric motor 24 for the blade via a power transmission unit 25 for the blade. Note that, the term "separately" means that the rotating discharge blade 42 and the rotating rotor 32 rotate separately, the rotation directions thereof may be the same or different. Since the rotation of the rotating rotor 32 is performed for refining the processing substance, the rotating rotor 32 is operated with the optimum rotation number for the purpose. On the other hand, since the rotation of the rotating discharge blade 42 is performed to smoothly discharge the processing substance after completion of the degassing treatment to outside of the vessel 10, the rotation of the rotating discharge blade 42 is operated with an optimum rotation number for the purpose. Accordingly, regardless of whether the rotation driving sources is the same or not, they rotate separately.

Specifically, the rotation speed of the rotating rotor 32 is appropriate in the range of about 500 rpm to 8000 rpm, and the rotation speed of the rotating discharge blade 42 is appropriate in the range of about 10 rpm to 400 rpm, although these rotation speeds are variable depending on the size of the vacuum deaerator.

In this embodiment, the rotating discharge blade 42 is a screw type rotating discharge blade extending spirally. The upper part of the rotating discharge blade 42 having a large diameter is supported by the rotary shaft 43 via a supporting body 44, while the lower part of the rotating discharge blade 42 having a small diameter is directly supported by the rotary shaft 43; the lower end of the rotating discharge blade 42 reaches the position facing to the discharge port 14. In the case of a highly viscous processing substance, since the processing substance adheres to the inner wall surface of the vessel 10 for which causes the processing substance does not easily reach to the center part of the vessel, the upper part of the rotating discharge blade 42 having a large diameter has a hollow state without a blade in the center, however, it may be carried out in a such way that the rotating discharge blade 42 is provided so as to reach the rotary shaft 43 over the entire area in the up and down direction, and no hollow state is existed in the center.

By rotating the rotating discharge blade 42, even with a highly viscous processing substance, occurrence of retaining more than necessary of the processing substance inside the vessel can be suppressed by forcibly being sent to the discharge port 14.

As mentioned above, the processing substance after completion of collision forms a thin film fluid along the inner wall surface of the cylindrical part 12 to defoam the finer air bubbles, but it is appropriate to limit the retention amount of the processing substance to such a degree that the function thereof does not impaired. Specifically, it is appropriate to limit the degree at which the processing substance is accommodated in the lower funnel part 13 at the most, however when the length of cylindrical part 12 in the axial direction is made longer, the retention amount may be retained by halfway.

The lower part of the vessel 10, in this example, the lower part of the cylindrical part 12, may be in the cylindrical shape rather than in the funnel shape, but the funnel shape is more advantageous in the point that the funnel shape is gradually pressurized and the push-in effect on the discharge pump 54 that is connected to the charging port 19 is enhanced.

Depending on the kinds of fluid, the discharge pump 54 may not be connected to the charging port 19, but in the case of a highly viscous processing substance, it is preferable to install a rotary positive displacement type uniaxial eccentric screw pump or a high vacuum pull-out type diaphragm pump as the discharge pump 54.

As a result, by rotation of the rotating discharge blade 42 arranged along the inner wall surface of the funnel part 13, the processing substance can be pushed into the discharge pump 54 while being pressurized, and even with a highly viscous processing substance, the continuous discharge can be realized by the synergistic effect of both the push-in action and the suction action of the discharge pump.

As a result, even in the case of a highly viscous processing substance, the continuous degassing treatment can be carried out with suppressing the necessity of the interrupted discharge.

As an example, one sheet of the rotating discharge blade 42 is shown, but it may be multiple sheets of two or more, may be continuously extended or may be intermittently extended.

The clearance between the outer circumference of the rotating discharge blade 42 and the inner wall surface of the vessel 10 (in this example, the funnel part 13) is preferably in the range of about 0.1 mm to 2 mm; but this value may be arbitrarily changed so far as the processing substance can be forcibly sent to the discharge port 14. A driving device 21 comprising the electric motor 22 for the rotor, the power transmission unit 23 for the rotor, the electric motor 24 for the blade, and the power transmission unit 25 for the blade is advantageous in the point that this device is provided on the cover body 15 that is opposite side to the discharge port 14 in the axis direction of the driving axis 35 and the rotary shaft 43, so that the inner space of the vessel 10 provided with the discharge device 41 can be designed to have the most advantageous shape for discharging highly viscous processing substance; but the driving device 21 may be arranged on the same side of the discharge port 14 in the container main body 11.

REFERENCE NUMERALS

10 Vessel
11 Container main body
12 Cylindrical part
13 Funnel part
14 Discharge port
15 Cover body
16 Vacuum port
17 Introduction port
18 Annular path
19 Charging port
21 Driving device
22 Electric motor for rotor
23 Power transmission unit for rotor
24 Electric motor for blade
25 Power transmission unit for blade
31 Refining device
32 Rotating rotor
33 First screen
34 Second screen
35 Driving axis
41 Discharge device
42 Rotating discharge blade
43 Rotary shaft
44 Supporting body
51 Supply source
52 Temperature adjusting mechanism
53 Vacuum pump
54 Discharge pump

The invention claimed is:
1. A vacuum deaerator equipped with a refiner, wherein comprising:
a vessel configured to deaerate and discharge a processing substance to outside of the vessel;

a rotating disc-shaped rotor arranged in the vessel; and a rotating discharge blade configured to discharge the processing substance inside of the vessel to outside of the vessel that rotates separately from the disc-shaped rotor, wherein the disc-shaped rotor is above the rotating discharge blade.

2. The vacuum deaerator equipped with the refiner according to claim 1, wherein the disc-shaped rotor is provided with the refiner, wherein the refiner is a refining screen arranged in the disc-shaped rotor, and wherein the rotating discharge blade is a screw type rotating discharge blade.

3. The vacuum deaerator equipped with the refiner according to claim 1, wherein a temperature control mechanism is installed to the vessel.

4. The vacuum deaerator equipped with the refiner according to claim 1, wherein a rotary positive displacement uniaxial eccentric screw pump or a vacuum pull-out type diaphragm pump is installed for the purpose of continuously pulling out the processing substance from the vessel.

5. The vacuum deaerator equipped with the refiner according to claim 2, wherein a temperature control mechanism is installed to the vessel.

6. The vacuum deaerator equipped with the refiner according to claim 2, wherein a rotary positive displacement uniaxial eccentric screw pump or a vacuum pull-out type diaphragm pump is installed for the purpose of continuously pulling out the processing substance from the vessel.

7. The vacuum deaerator equipped with the refiner according to claim 3, wherein a rotary positive displacement uniaxial eccentric screw pump or a vacuum pull-out type diaphragm pump is installed for the purpose of continuously pulling out the processing substance from the vessel.

8. The vacuum deaerator equipped with the refiner according to claim 1, wherein the refiner extends upwardly from the disc-shaped rotor.

9. The vacuum deaerator equipped with the refiner according to claim 1, further comprising a first screen extending upwardly from the disc-shaped rotor as the refiner.

10. The vacuum deaerator equipped with the refiner according to claim 1, further comprising a first screen and a second screen extending upwardly from the disc-shaped rotor as the refiner, the first screen located radially inwardly of the second screen.

11. The vacuum deaerator equipped with the refiner according to claim 1, wherein a diameter of the disc-shaped rotor is less than a maximum diameter of the rotating discharge blade.

* * * * *